(12) United States Patent
Watkins et al.

(10) Patent No.: US 11,580,616 B2
(45) Date of Patent: Feb. 14, 2023

(54) PHOTOGRAMMETRIC ALIGNMENT FOR IMMERSIVE CONTENT PRODUCTION

(71) Applicant: Lucasfilm Entertainment Company Ltd., San Francisco, CA (US)

(72) Inventors: Douglas G. Watkins, Vallejo, CA (US); Paige M. Warner, San Francisco, CA (US); Dacklin R. Young, San Rafael, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 172 days.

(21) Appl. No.: 17/229,444

(22) Filed: Apr. 13, 2021

(65) Prior Publication Data

US 2021/0342971 A1 Nov. 4, 2021

Related U.S. Application Data

(60) Provisional application No. 63/017,482, filed on Apr. 29, 2020.

(51) Int. Cl.
| | | |
|---|---|---|
| *G06T 3/00* | (2006.01) | |
| *G06T 7/73* | (2017.01) | |
| *G06T 7/00* | (2017.01) | |
| *G06T 7/33* | (2017.01) | |

(52) U.S. Cl.
CPC ............. *G06T 3/0075* (2013.01); *G06T 7/33* (2017.01); *G06T 7/73* (2017.01); *G06T 7/97* (2017.01); *G06T 2207/10028* (2013.01)

(58) Field of Classification Search
CPC .......... G06T 3/0075; G06T 7/73; G06T 7/97; G06T 7/33; G06T 2207/10028
See application file for complete search history.

(56) References Cited

U.S. PATENT DOCUMENTS

| | | | | |
|---|---|---|---|---|
| 6,741,241 | B1* | 5/2004 | Jaubert ................. | H04N 5/222 348/E5.022 |
| 8,671,338 | B2* | 3/2014 | Ambrosino .......... | G06F 40/143 715/848 |
| 10,529,117 | B2* | 1/2020 | Hunt ...................... | G06T 15/06 |
| 11,145,117 | B2* | 10/2021 | Smith .................... | G06T 15/10 |
| 11,157,739 | B1* | 10/2021 | Iskandar ............... | H04W 4/021 |

(Continued)

*Primary Examiner* — Ian L Lemieux
(74) *Attorney, Agent, or Firm* — Kilpatrick Townsend & Stockton LLP (57) ABSTRACT

A method of content production includes generating a survey of a performance area that includes a point cloud representing a first physical object, in a survey graph hierarchy, constraining the point cloud and a taking camera coordinate system as child nodes of an origin of a survey coordinate system, obtaining virtual content including a first virtual object that corresponds to the first physical object, applying a transformation to the origin of the survey coordinate system so that at least a portion of the point cloud that represents the first physical object is substantially aligned with a portion of the virtual content that represents the first virtual object, displaying the first virtual object on one or more displays from a perspective of the taking camera, capturing, using the taking camera, one or more images of the performance area, and generating content based on the one or more images.

20 Claims, 7 Drawing Sheets

(56) References Cited

U.S. PATENT DOCUMENTS

| | | | | |
|---|---|---|---|---|
| 2002/0095276 | A1* | 7/2002 | Rong | G06T 17/00 |
| | | | | 703/2 |
| 2009/0271715 | A1* | 10/2009 | Tumuluri | H04N 21/47202 |
| | | | | 715/733 |
| 2011/0304735 | A1* | 12/2011 | Van Eaton | H04N 5/262 |
| | | | | 348/E7.085 |
| 2015/0062170 | A1* | 3/2015 | Kim | H04N 9/3147 |
| | | | | 345/634 |
| 2016/0261902 | A1* | 9/2016 | Yerli | H04N 21/4126 |
| 2020/0175766 | A1* | 6/2020 | Gawrys | G06F 16/9027 |

* cited by examiner

PHOTOGRAMMETRIC ALIGNMENT FOR IMMERSIVE CONTENT PRODUCTION

CROSS-REFERENCE TO RELATED APPLICATIONS

This present application is a non-provisional application of, and claims the benefit and priority under 35 U.S.C. 119(e) of U.S. Provisional Application No. 63/017,482, filed on Apr. 29, 2020, the entire contents of which is incorporated by reference for all purposes.

BACKGROUND

One method of creating a virtual reality experience can include surrounding a user with large display screens that present a virtual environment for the user. For example, an immersive content production system that can be used in production of movies and videos can include a stage or performance area that is at least partially enclosed with one or more walls and/or a ceiling each of which can be covered with display screens. One or more cameras can be placed in the performance area and live actors can interact with physical props placed on the stage, as well as with virtual elements displayed on the displays. Such immersive content production systems can present challenges for seamlessly bridging the physical props in the performance area with the virtual elements displayed on the displays so that the virtual elements appear realistic in the movies or videos captured by the cameras.

SUMMARY

According to some embodiments, a method of content production includes generating a survey of a performance area. The survey includes a point cloud representing one or more physical objects including a first physical object in the performance area. The point cloud is associated with a survey coordinate system having an origin corresponding to a reference point in the performance area. The method further includes, in a survey graph hierarchy, constraining the point cloud and a taking camera coordinate system as child nodes of the origin of the survey coordinate system, so that the point cloud and the taking camera coordinate system inherit changes to the origin of the survey coordinate system. The method further includes obtaining virtual content including one or more virtual objects associated with a virtual coordinate system. The one or more virtual objects include a first virtual object that corresponds to the first physical object. The method further includes applying a transformation to the origin of the survey coordinate system so that at least a portion of the point cloud that represents the first physical object is substantially aligned with a portion of the virtual content that represents the first virtual object, detecting a current position and a current orientation of the taking camera in the taking camera coordinate system, displaying the first virtual object on one or more displays surrounding the performance area from a perspective of the taking camera at the current position and the current orientation, capturing, using the taking camera, one or more images of the performance area including the first physical object and at least a portion of the one or more displays on which the first virtual object is being displayed, and generating content based on the one or more images.

According to some embodiments, an immersive content production system includes a performance area, one or more displays surrounding the performance area for displaying virtual content, a taking camera for capturing images of the performance area and a portion of the one or more displays displaying the virtual content, one or more sensors for detecting a current position and a current orientation of the taking camera in a taking camera coordinate system, and a computer memory. The computer memory is configured to store a survey of the performance area associated with a survey coordinate system having an origin corresponding to a reference point in the performance area. The survey includes a point cloud representing a first physical object in the performance area. The computer memory is further configured to store the virtual content associated with a virtual coordinate system. The virtual content includes a first virtual object corresponding to the first physical object. The immersive content production system further includes one or more computer processors configured to: in a survey graph hierarchy, constrain the point cloud and the taking camera coordinate system as child nodes of the origin of the survey coordinate system, so that the point cloud and the taking camera coordinate system inherit changes to the origin of the survey coordinate system; apply a transformation to the origin of the survey coordinate system so that at least a portion of the point cloud that represents the first physical object is substantially aligned with a portion of the virtual content that represents the first virtual object; and cause the virtual content to be displayed on the one or more displays from a perspective of the taking camera at the current position and the current orientation while the taking camera is capturing the images. The images include the first physical object and at least a portion of the one or more displays on which the first virtual object is being displayed.

DETAILED DESCRIPTION

According to some embodiments, methods and systems of photogrammetric alignment for immersive content production are provided. For example, immersive content (e.g., virtual reality content, mixed reality content, augmented reality content, and the like) can be leveraged as part of a content production system used by users (e.g., artists, engineers, technicians, directors, and other individuals involved in content production) in order to generate content (e.g., movies, television programming, online or streaming videos, and the like). To configure such a content production system, physical items in a performance area and virtual items displayed on displays surrounding the performance area can be advantageously aligned with respect to each other so that they appear seamless and perspective-correct to a viewer.

Figure 1:
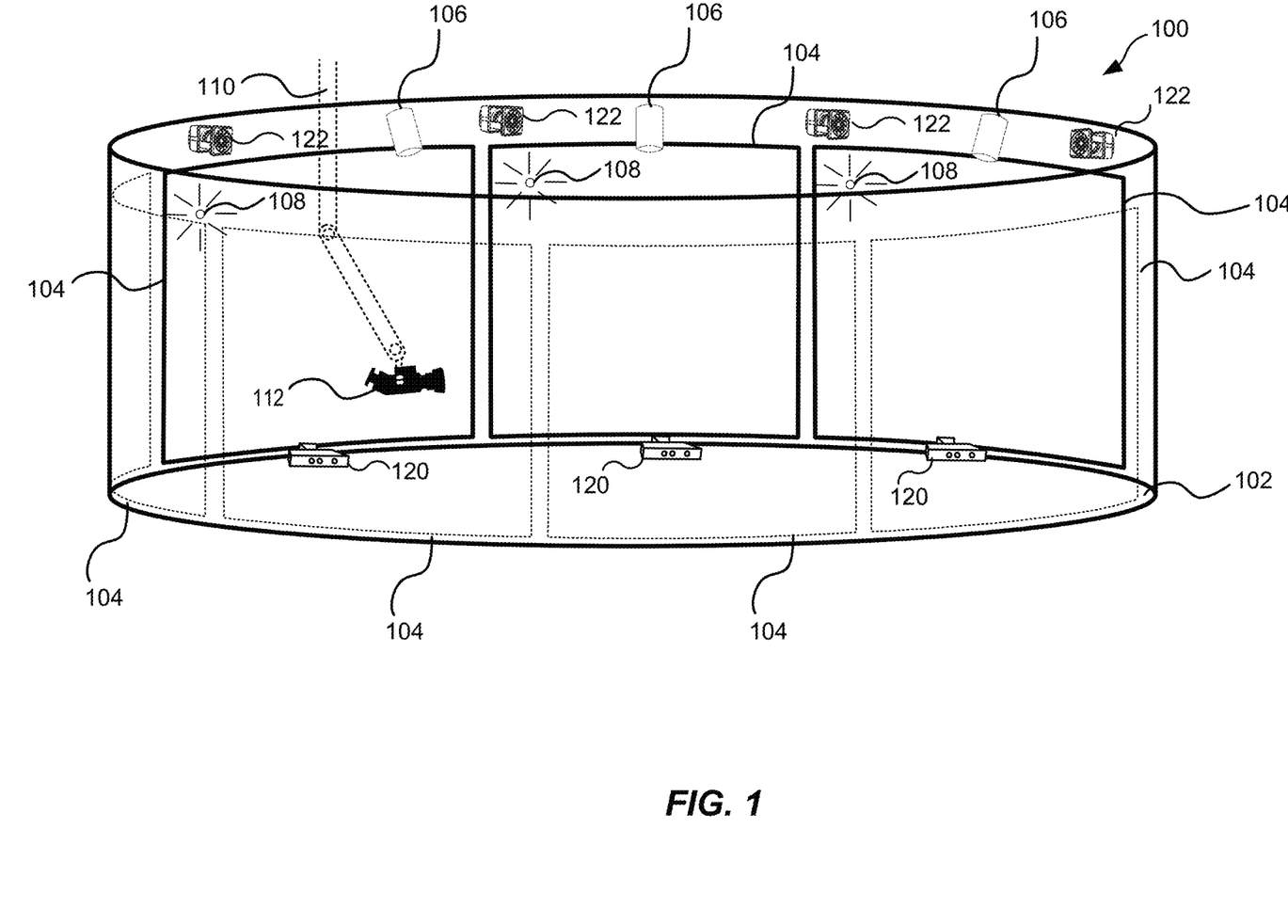
FIG. 1 illustrates an immersive content production system according to some embodiments.

FIG. 1 is a simplified illustration of an immersive content production system 100 according to some embodiments. The immersive content production system 100 can include a performance area 102 that is partially or completely surrounded by image displays 104 (also referred to herein as just "displays"). the immersive content production system 100 can obtain virtual content and display the virtual content on the displays 104.

The performance area 102 can be, for example, a movie or television set, a stage, a stadium, a park, or the like. In one aspect, the immersive content production system 100 presents images in real-time or at interactive frame rates to users of the immersive content production system 100 (e.g., performers within the performance area 102). Since the displays 104 surround or partially surround the performance area 102, the immersive content production system 100 can create an immersive environment (also referred to as an immersive "cave" or immersive "walls") for performances that take place within the performance area 102. In this way, an actor or actress performing within the performance area 102 can appear to be in a virtual environment.

In some embodiments, the displays 104 can include light emitting diode (LED) display screens or liquid crystal display (LCD) display screens. For example, the performance area 102 can include one or more walls of LED or LCD displays 104 enclosing the performance area 102. Alternatively, the performance area 102 can be partially or completely surrounded by projector screens. A set of projectors can be configured to project images on the projector screens. In some embodiments, the performance area 102 can be surrounded by a combination of LED display screens, LCD display screens, and/or projector screens.

According to various embodiments, the displays 104 can have various sizes, and the performance area 102 can also have various sizes. In some embodiments the displays 104 can be 20-40 feet tall, and the performance area 102 can be, for example, between 50-100 feet in diameter. In some embodiments, the displays 104 can include multiple displays 104 that are generally fixed in position and mostly surround the performance area 102, along with additional moveable or mobile displays 104 that can be moved into positions that create an immersive environment that extends completely or almost completely (i.e., 300-360 degrees) around the performance area 102. As an example, in one embodiment, fixed position displays 104 can extend approximately 270 degrees around the performance area 102, while moveable displays 104 can be used to augment the fixed position displays to further extend the immersive environment up to 320 degrees or up to 360 degrees around the performance area. Additionally, while not shown in FIG. 1, in some embodiments, the immersive content production system 100 can further include one or more displays 104 as a ceiling on the performance area 102 and/or as part of the floor of the performance area 102. Also, while for ease of illustration, the displays 104 are shown in FIG. 1 as having a small space or gap 105 between adjacent displays 104, the displays 104 can be installed so as to be seamless, with less than a threshold distance or even no space between adjacent displays 104. In some instances, the displays 104 may be curved.

A taking camera 112 can be attached to a rig 110 and can be aimed at the performance area 102 to capture the performance of a performer as well as the virtual environment displayed on the displays 104. In some embodiments, sensors can be used to determine the position and orientation of the taking camera 112 during a performance. For example, GPS based sensors (not shown) can be attached to the taking camera 112 to determine its position within or relative to the performance area 102.

In some embodiments, other cameras (e.g., motion capture, and/or alignment cameras 122 discussed below) can be directed at the taking camera 112 and/or configured to capture the performance. One or more markers can be attached to the taking camera 112. During a performance, the other cameras can capture images of the taking camera 112 as the taking camera 112 is moved and oriented during the performance. The immersive content production system 100 can use the captured images of the taking camera 112 to determine the movement and orientation of the taking camera 112 during the performance. Such information can be used to support the content production process. For example, such information regarding the orientation and movement of the taking camera 112 can be used to determine the distance of the taking camera 112 from a performer over a performance. Based on the orientation and the movement (as well as other intrinsic attributes such as lens aperture and focal length) of the taking camera 112, the immersive content production system 100 can adjust the virtual environment displayed by the immersive cave or walls in real-time or at interactive frame rates to correspond to the orientation and the position of the taking camera 112. In this way, images of the virtual environment can be made perspective-correct with respect to the performance of the performer.

In some embodiments, the immersive cave or walls can include one or more lighting elements to provide lighting for performance area 102. For example, the immersive cave or walls can include supplemental LED lights 106 separate from the displays 104 that can light the performance area 102 (including the performer) and create various desired lighting effects. Thus, the LED lights 106 can have the ability to project lighting levels of different intensities and project such light from different locations around the stage. In some embodiments the additional LED lights 106 can be controlled during a performance in order to change the intensity of the lighting of performance area 102 (including the performer).

In some embodiments, additional lighting elements can be created within one or more portions of the various displays 104 that create the virtual environment. For example, instead of depicting the virtual environment in a portion of one or more of the displays 104 surrounding the performance area, that portion of the display 104 can simulate an LED light 108 that illuminates the performance area 102. The immersive content production system 100 can include multiple simulated lights 108. The location of each simulated light 108 on the displays 104 can be selected in order to achieve a desired lighting effect. The selection and placement of simulated lights 108 can be made by a director, lighting technician or other user of the immersive content production system 100, prior to the performance taking place within the performance area 102 and being filmed by the taking camera 112. The number and the location of the simulated lights 108 can be readily adjusted at any time during the performance.

Since the simulated lights 108 are created by the displays 104 and are thus part of the displays 104, such simulated lights 108 are also referred to as "embedded lights" or "virtual lights." The simulated lights 108 can be in addition to or instead of the supplemental lights 106. In some embodiments, the immersive content production system 100 can include simulated lights 108 without any supplemental lights 106. In some embodiments, the taking camera 112 that is capturing images of the performance area and/or the camera rigs 110 do not include any attached lights. For example, in some embodiments the taking camera 112 does not include a ring of LED lights or other form of lighting for illuminating the performance area 102.

In some embodiments, the immersive content production system 100 can further include one or more depth sensors 120 and/or one or more alignment cameras 122. The alignment cameras 122, also referred to as motion cameras, can capture motions in the performance area 102. During a performance, the immersive content production system 100 can detect the motion and/or the positions and the orientations of the performers within the performance area 102. The detection can be based on markers or sensors worn by a performer, as well as by the depth sensors 120 and/or by the alignment cameras 122. For example, an array of depth sensors 120 can be positioned in proximity to and directed at the performance area 102. For instance, the depth sensors 120 can surround the perimeter of the performance area. In some embodiments, the depth sensors 120 can measure the depth of different parts of a performer in the performance area 102 over the duration of a performance. The depth information can then be stored and used by the immersive content production system 100 to determine the positions of the performer over the course of the performance.

The depth sensors 120 can include a motion-sensing input device. The depth sensor 120 can include a monochrome complementary metal-oxide semiconductor (CMOS) sensor and an infrared projector. The infrared projector can project infrared light throughout the first performance area 102, and the CMOS sensor can measure the distance of each point of reflected infrared (IR) radiation in the performance area 102 by measuring a time it takes for the emitted infrared light to return to the CMOS sensor. Software in the depth sensors 120 can process the IR information received from the depth sensor 120 and use an artificial intelligence machine-learning algorithm to map the visual data and create three-dimensional (3-D) depth models of solid objects in the performance area 102. For example, the one or more depth sensors 120 can receive emitted infrared radiation to generate 3-D depth models of a performer, along with the floor, walls, and/or ceiling of the performance area 102. In one test embodiment, the performance area 102 was surrounded by six to eight Kinect® cameras to capture depth information of objects and performers in the performance area 102.

The alignment cameras 122 can be part of a motion capture system that can track the movement of performers or objects within the immersive content production system 100. The alignment cameras 122 can be used to support alignment of virtual assets and physical assets, as described in more detail below. In some instances, the alignment cameras 122 can be used to track the movement of the taking camera 112 and provide a location of the taking camera to the immersive content production system 100. The immersive content production system 100 can use this information to determine what portion of the displays 104 is to be rendered from the tracked position and the perspective of the taking camera 112.

Figure 2:
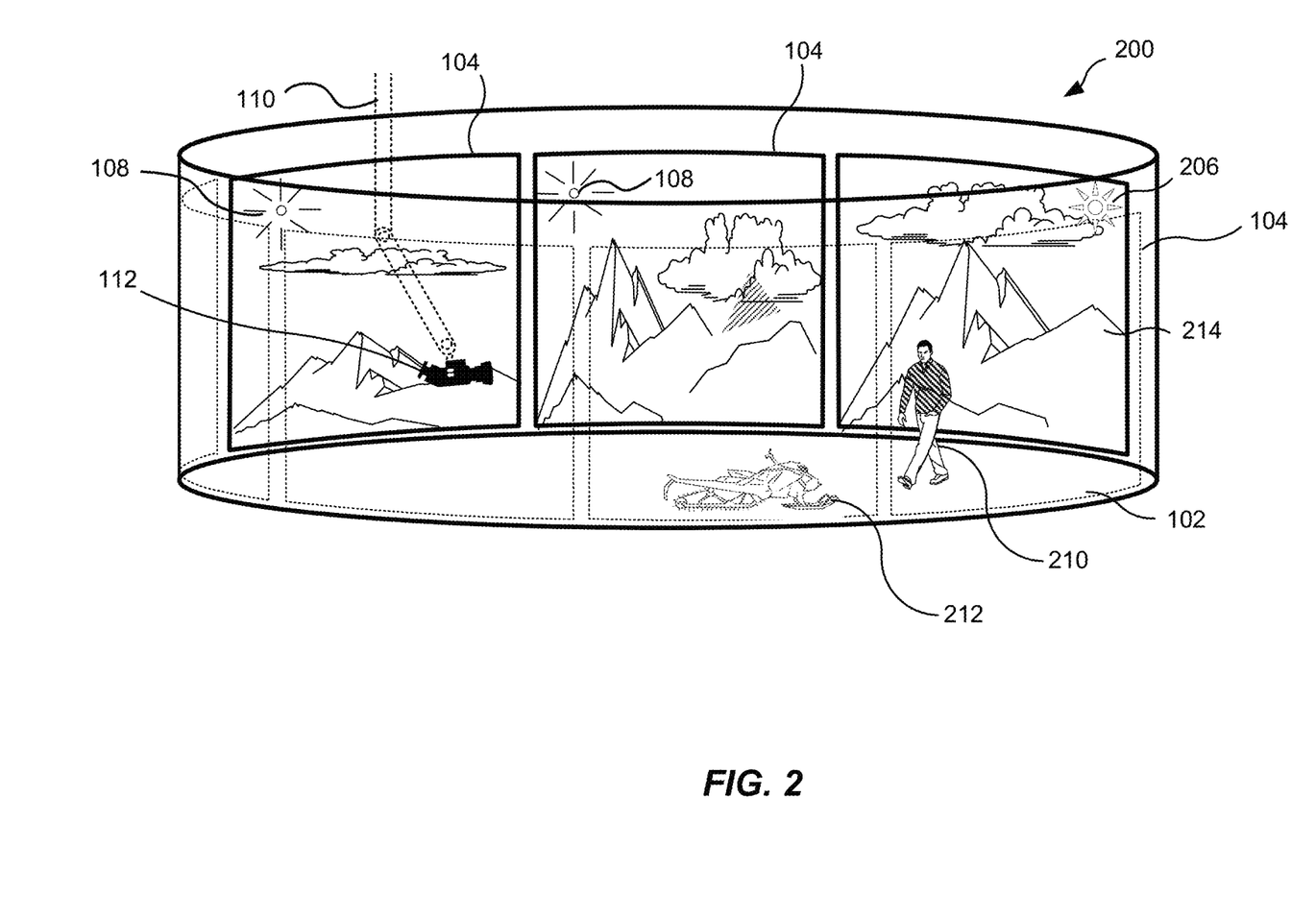
FIG. 2 illustrates an immersive content production system with a performer on the stage and scenery depicted on the image displays according to some embodiments.

FIG. 2 is a simplified illustration of an immersive content production system 200 according to some embodiments. The immersive content production system 200 can be similar to the immersive content production system 100, and thus includes many or all of the same components as described with respect to FIG. 1. As shown in FIG. 2, the immersive content production system 200 can include the performance area 102, the displays 104, the simulated lights 108, and the taking camera 112 attached to the rig 110.

In FIG. 2, a performer 210 is also shown within the performance area 102. The performance area 102 can include one or more physical props 212 (e.g., the snowmobile depicted in FIG. 2). Scenery images 214 of a virtual environment can be presented on the displays 104 to generate the immersive environment in which the performer 210 can conduct his or her performance (e.g., act out a scene in a movie being produced). In some embodiments, the scenery images 214 can be seamlessly presented across several displays 104 as described with respect to FIG. 1. The scenery images 214 can include one or more virtual light sources 206 that can be, for example, an image of a sun, a moon, stars, street lights, or other natural or manmade light sources displayed in the scenery images 214.

The scenery images 214 can also provide a background for the video content captured by the taking camera 112 (e.g., a visible light camera). The taking camera 112 can capture a view of performance area 202 from a certain perspective. In some embodiments, the taking camera 112 can be stationary, while in some other embodiments, the taking camera 112 can be mounted to a track 110 that can move the taking camera 112 during a performance.

Figure 3:
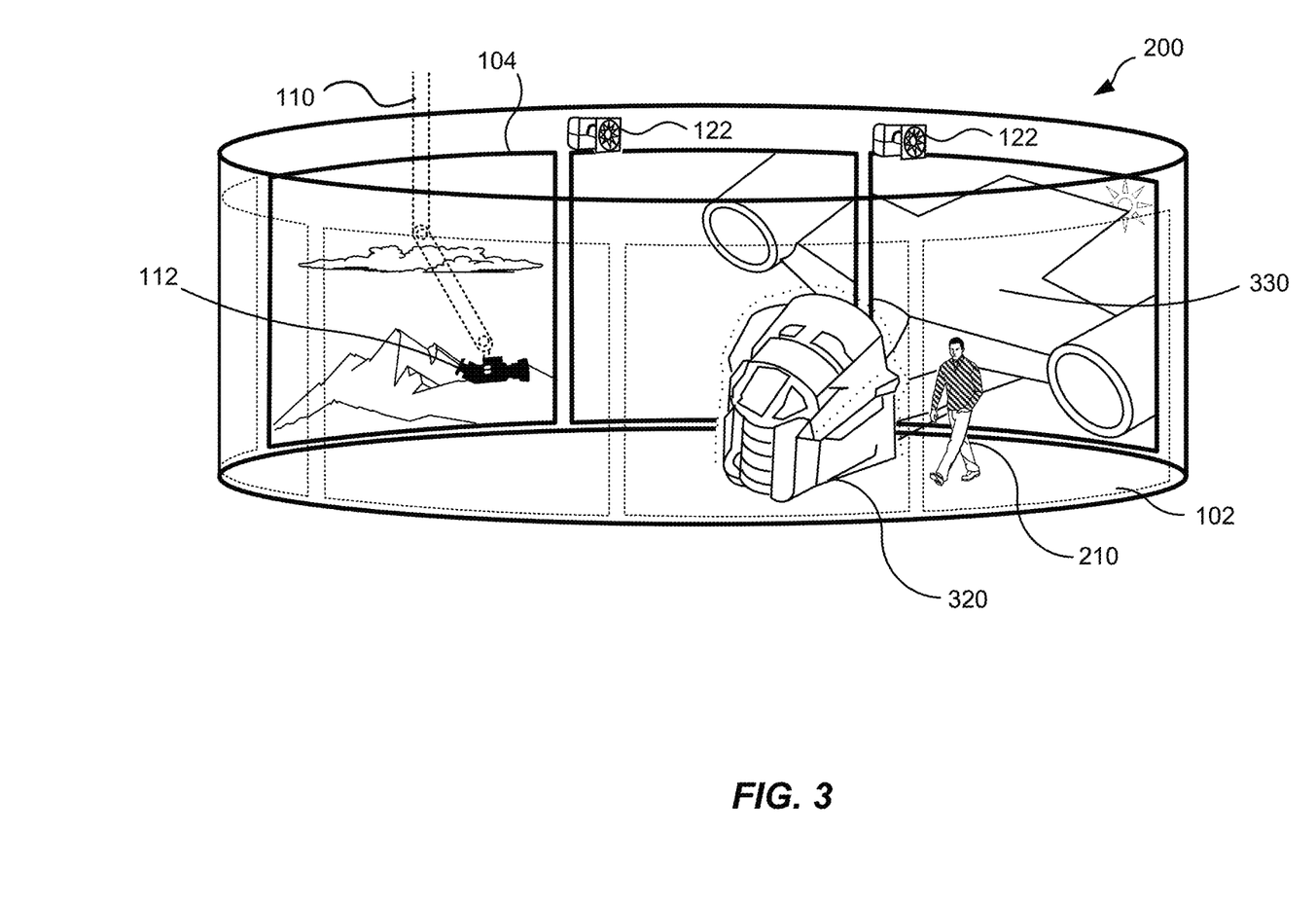
FIG. 3 illustrates an immersive content production system with a physical prop in the performance area according to some embodiments.

In some embodiments, the scenery images 214 can also include virtual objects that are intended to appear as extensions of the physical objects in the performance area 102. FIG. 3 illustrates an example. In this example, the performance area 102 includes a physical prop 320, which is a canopy 320 of a spaceship. The scenery images 214 displayed on the displays 104 can include a virtual spaceship 330 that is intended to be an extension of the physical canopy 320 in the performance area 102.

According to some embodiments, the immersive content production system can display virtual content (e.g., virtual scenes and virtual objects) from the perspective of the taking camera 112 onto portions of the displays 104 that are within the field of view (i.e., the frustum) of the taking camera 112. Areas of the displays 104 outside the field of view of the taking camera 112 can be displayed according to a global view perspective. For instance, in the example illustrated in FIG. 3, the immersive content production system can display the virtual spaceship 330 from the perspective of the taking camera 112. Thus, images (e.g., a movie or video) taken by the taking camera 112 can possibly give a viewer an illusion that the physical canopy 320 and the virtual spaceship 330 are an integral part. To achieve this visual effect, it is desirable that the virtual spaceship 330 is properly aligned with the physical canopy 320, so that they appear to be contiguous and seamlessly connected to each other.

According to some embodiments, the immersive content production system can store virtual content in a computer system. For example, the virtual content can include virtual scenes and virtual objects, such as mountains, a spaceship, and the like. The virtual content can be in the form of a 3-D mesh, a point cloud, or the like. The virtual content can be generated by computer graphics, or by scanning a physical scene. The immersive content production system can also generate a survey of the volume of the stage (e.g., including the performance area 102, the surrounding displays 104, any physical props in the performance area 102, etc.), and store the survey in the computer system. The survey is a record of the physical layout of the immersive content production system, and can be in the form of a point cloud and/or a mesh.

According to some embodiments, the immersive content production system can perform photogrammetric alignment between the survey of the volume and the virtual scene, so that physical items in the performance area 102 and virtual items and/or scenery images displayed on the displays 104 are aligned with respect to each other when viewed from the perspective of the taking camera 112. In this manner, the physical items and the virtual items can appear to a viewer to be seamlessly connected with each other in the images captured by the taking camera 112. The processes of generating a survey of the volume and alignment of the survey with respect to the virtual scene are discussed in more detail below.

In some embodiments, to generate a survey of the volume of the performance area, one or more alignment devices can be placed in locations surrounding the performance area. The alignment devices can include cameras, wireless sensors, and the like. For example, the alignment devices can include the alignment cameras 122 in the immersive content production system 100 illustrated in FIG. 1. Once placed, the exact position and orientation of each respective alignment camera 122 can be determined. The position and the orientation of each respective alignment camera 122 are referred to as the extrinsic properties of the respective alignment camera 122. Each alignment camera 122 also has intrinsic properties, such as the focal length and distortion properties of its lens. The intrinsic properties of each alignment camera 122 can be obtained from manufacturer's technical specifications and through optical calibration techniques. The processes of determining the extrinsic and intrinsic properties of the alignment cameras 122 are referred to herein as pre-calibration processes.

In some embodiments, an array of alignment cameras 122 can be installed along the upper edge of the volume (e.g., between the ceiling and walls, like the alignment cameras 122 shown in FIG. 1). The array of alignment cameras 122 can be accessed from one or more computer workstations or servers. Prior to installing the alignment cameras 122, the intrinsic properties of the alignment cameras, such as the focal length and distortions of the lens can be determined. Once the alignment cameras 122 are installed, a pre-calibration process can be performed to determine the position and the orientation of each respective alignment camera 122 with respect to a reference frame of the volume (e.g., in a Cartesian coordinate system with its origin at the center of the floor of the performance area 102). In some embodiments, the pre-calibration process can include generating a set of unique fiducial markers for each physical asset in the performance area 102, and capturing an image of the physical asset on the displays 104 from each respective alignment camera 122. By identifying the fiducial markers and their positions in the image on the displays 104, the position and the orientation of the respective alignment camera 122 can be determined. In some embodiments, the taking cameras 112 can also be used as an alignment camera.

The alignment cameras 122 can acquire images (e.g., 2-D images) of the physical layout of the volume from their respective viewpoints. The collection of images are referred to herein as a dataset. The immersive content production system can process the dataset using photogrammetric techniques to construct a survey (e.g., in the form of a point cloud) of the volume. Exemplary photogrammetric techniques can include Motion (SFM), Multi-View Environment (MVE), Patch Based Multi-View Stereo (PMVS), and the like. The processing of the dataset can be sped up over traditional photogrammetry using the pre-calibrated extrinsic and intrinsic properties of the alignment cameras 122. In this manner, a dense point cloud can be generated directly from the dataset. In some embodiments, the point cloud can also be used to generate a 3-D mesh. The point cloud and/or the mesh can serve as a survey of the volume of the performance area.

Figure 4A:
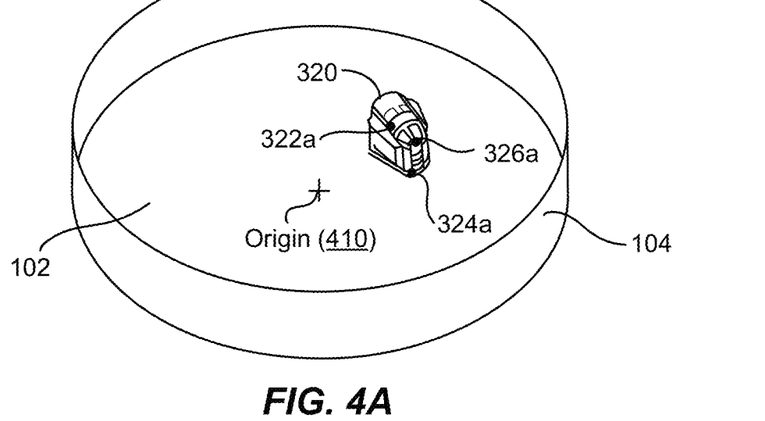
FIGS. 4A-4C illustrate alignment between a survey of a volume of a performance area and a virtual scene according to some embodiments.

FIG. 4A illustrates an exemplary survey of the volume of the performance area 102 illustrated in FIG. 3. The survey can include a dense point cloud and/or a mesh that represent the displays 104 surrounding the performance area 102, as well as the physical props 320 (e.g., the canopy of a spaceship). In the discussions below, the term "point cloud" will be used to refer to a point cloud and/or a mesh. The point cloud can be constrained to a single point, referred to as the origin 410, within the representation of the performance area 102. This origin 410 can be the parent in a graph hierarchy, as discussed below.

Figure 4B:
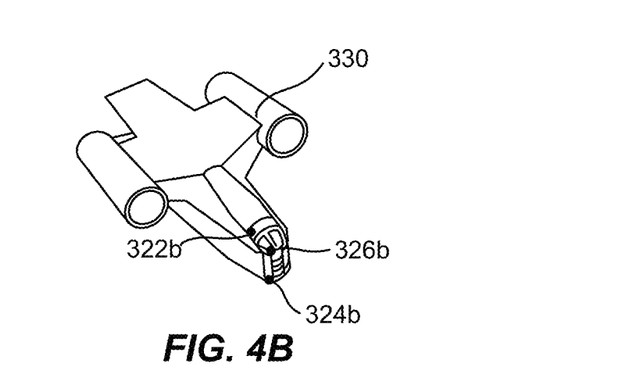
Figure 4C:
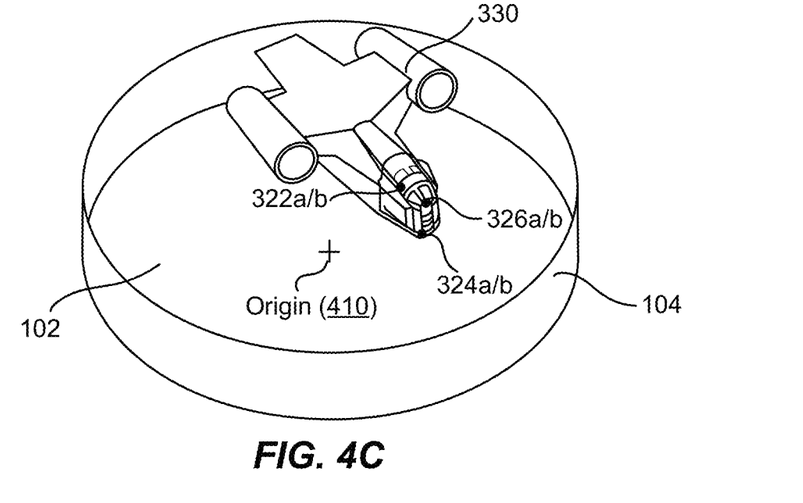

FIG. 4B illustrates an exemplary virtual asset. For example, the virtual asset can be the spaceship 330, whose canopy corresponds to the physical prop 320 in the performance area 102. According to some embodiments, the survey of the volume (e.g., the survey illustrated in FIG. 4A) can be positioned within the virtual world, and be properly aligned with respect to the virtual asset such that the point cloud representing the physical prop 320 can substantially match with the corresponding part of the virtual asset 330. For example, as illustrated in FIG. 4C, the point cloud representing the physical canopy 320 can be aligned with the canopy of the virtual spaceship 330.

To achieve the desired alignment, a transformation matrix (e.g., including a rotation followed by a translation, as well as a uniform scaling) can be determined so that, when applied to the point cloud of the survey, the transformed point cloud is properly aligned with respect to the virtual asset. The process of finding such a transformation can be referred to as registration. According to some embodiments, to register the point cloud with respect to the virtual asset, position locators can be created at various landmarks within the point cloud of the survey. These position locators are referred to as landmark nulls. The landmark nulls can be determined automatically or determined manually within the point cloud. Registration can be achieved by constraining the landmark nulls to matching target nulls on the corresponding virtual asset.

For instance, in the example illustrated in FIG. 4A, three landmark nulls 322a, 324a, and 326a can be created at three different locations on the point cloud representing the physical canopy 320. Referring to FIG. 4B, three target nulls 322b, 324b, and 326b can be created at corresponding locations on the canopy of the virtual spaceship 330. The landmark nulls 322a, 324a, and 326a can be constrained to the target nulls 322b, 324b, and 326b, respectively, as illustrated in FIG. 4C. In some embodiments, the pairs of constrained nulls 322a/b, 324a/b, and 326a/b can then be used as inputs, and be processed with a solver with a least squares regression by minimizing the distance between each pair of nulls 322a/b, 324a/b, and 326a/b to find the best fit (solve) for the position of the origin 410 of the survey coordinate system within the virtual world. The solve can be a transformation that, when applied to the origin 410 of the survey coordinate system, results in optimal distances (e.g., minimal distances) between each pair of nulls 322a/b, 324a/b, and 326a/b. After the transformation, the origin 410 of the survey coordinate system is at a target position in the virtual world.

In some embodiments, registration between the point cloud and the virtual asset can be achieved by aligning the point cloud directly with respect to the virtual asset. A best fit algorithm, such as an iterative closest point (ICP) algorithm, can be used to determine a transformation to be applied to the point cloud, so as to achieve optimal alignment between the point cloud and the virtual asset. For instance, in the example illustrated in FIGS. 4A-4C, an ICP algorithm can be applied between the portion of the point cloud that represents the physical canopy 320 and the portion of the mesh that represents the canopy of the virtual spaceship 330 to determine a transformation matrix. When the transformation matrix is applied to the point cloud, the portion of the point cloud that represents the physical canopy 320 can substantially match the portion of the mesh that represents the canopy of the virtual spaceship 330, as illustrated in FIG. 4C.

Figure 5A:
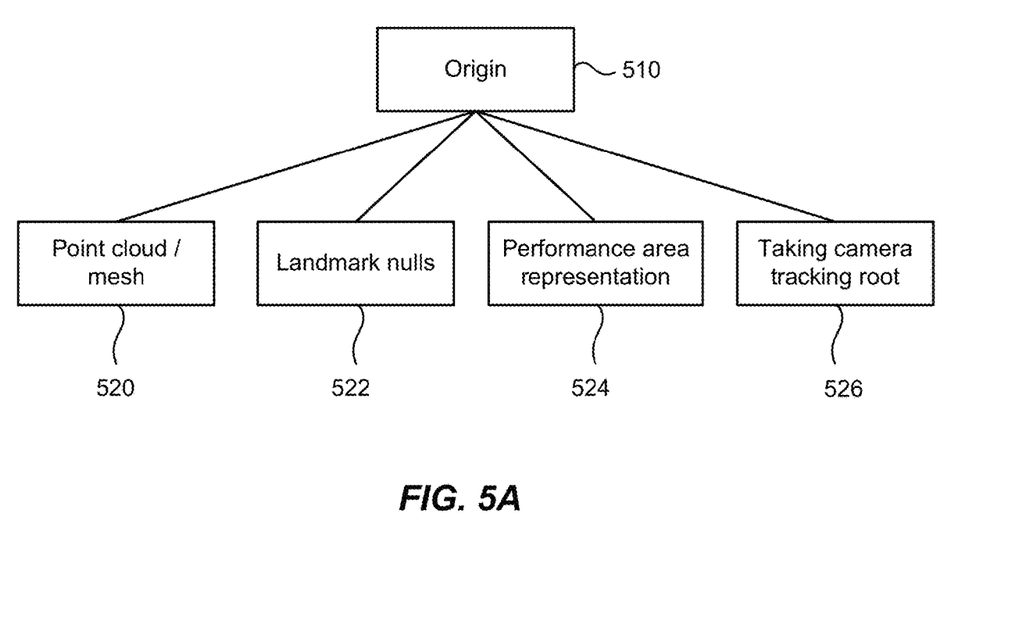
FIG. 5A illustrates an exemplary graph hierarchy for the survey according to some embodiments.

According to some embodiments, graph hierarchies can be used to define inheritance between objects. FIG. 5A illustrates an exemplary graph hierarchy for the survey. The origin 410 of the survey coordinate system is the parent node 510. The point cloud (e.g., a dense point cloud), the landmark nulls (e.g., the landmark nulls 322a, 324a, and 326a), a performance area representation (e.g., a CAD model of the performance area 102), and the taking camera tracking root are the child nodes 520, 522, 524, and 526, respectively. The taking camera tracking root is a coordinate system in which the position and the orientation of the taking camera 112 are tracked. The taking camera tracking root is also referred herein as the taking camera coordinate system. The child nodes 520, 522, 524, and 526 inherit the changes made to the parent node 510. Thus, when the origin 410 is transformed, the point cloud, the landmark nulls, the performance area representation, and the taking camera tracking root, all inherit the changes and are also transformed.

Figure 5B:
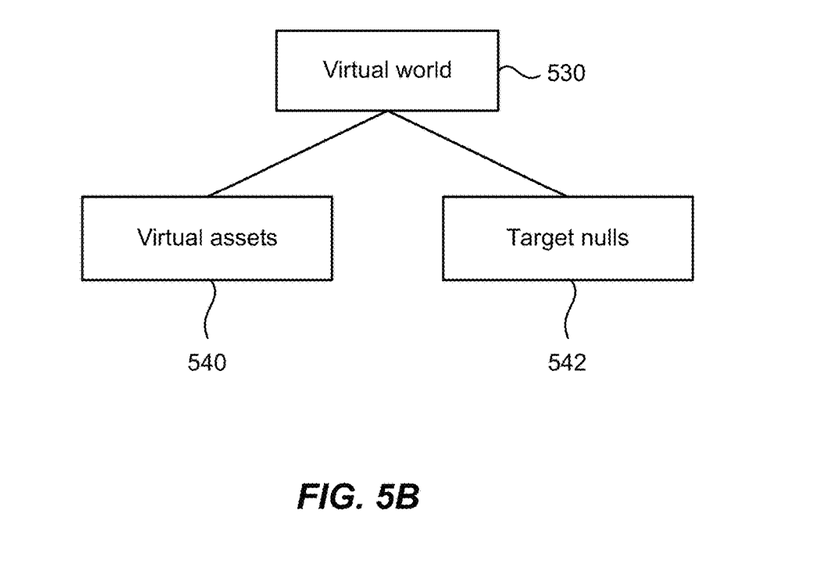
FIG. 5B illustrates an exemplary graph hierarchy for the virtual scene according to some embodiments.

FIG. 5B illustrates an exemplary graph hierarchy for the virtual scene. The virtual world coordinate system is the parent node 530. The virtual assets (e.g., the virtual spaceship 330 shown in FIG. 4B) and the target nulls (e.g., the target nulls 322b, 324b, and 326b) are the child nodes 540 and 542, respectively. The child nodes 540 and 542 inherit the changes made to the parent node 530.

As illustrated in FIG. 4C, after the transformation is applied to the origin 410 of the survey, the origin 410 is at a target position in the virtual world. Since the point cloud, the performance area representation, and the taking camera tracking root are all child nodes of the origin 410 in the survey graph hierarchy (as illustrated in FIG. 5A), the transformation to the origin 410 results in registration of the performance area 102, as well as the point cloud and the taking camera tracking root, to the virtual world. The survey graph hierarchy can then be used for displaying the virtual assets on the displays 104 in a perspective-correct manner relative to the physical props 320 through the taking camera 112, as discussed below.

Once the survey and the virtual world are aligned with respect to each other, the immersive content production system can display virtual content from the perspective of the taking camera 112 onto portions of the displays 104 that are within the field of view (i.e., the frustum) of the taking camera 112. For instance, in the example illustrated in FIG. 3, the immersive content production system can display the virtual spaceship 330 from the perspective of the taking camera 112. Because the physical canopy 320 is aligned with the virtual spaceship 330, images (e.g., a movie or video) taken by the taking camera 112 can give a viewer an illusion that the physical canopy 320 and the virtual spaceship 330 are an integral part. According to some embodiments, the immersive content production system can determine and track the position and the orientation of the taking camera 112 using motion sensors, alignment cameras (e.g., the alignment cameras 122), and/or GPS receivers attached to the taking camera 112. The immersive content production system can then display virtual content on the displays 104 from the perspective of the taking camera 112 at the current position and the current orientation.

According to some embodiments, the taking camera 112 can capture a performance being performed within the volume of the immersive content production area. The captured performances can include a set of images (e.g., video) that includes both physical assets in the performance area 102 and virtual assets displayed on the displays 104. For example, the taking camera 112 can capture an image including a physical spaceship and a virtual building in the background. In some embodiments, an item can be represented by both virtual assets and physical assets. For instance, in the example illustrated in FIG. 3, the front portion of a spaceship can be a physical asset (e.g., the canopy 320) in the performance area 102, while the back portion of the spaceship may be a virtual asset displayed on the displays 104 (e.g., the virtual spaceship 330). In both cases, the point cloud in the survey can be used to align the physical assets and the virtual assets, so that the physical assets and the virtual assets can appear to a viewer of the generated content to be contiguous and correctly positioned with respect to each other. In some embodiments, the images captured by the taking camera 112 can be provided to a post processing system for further processing. For example, various visual effects and other edits may be made to the images captured by the taking camera 112 prior to any presentation or distribution to viewers (e.g., moviegoers).

Figure 6:
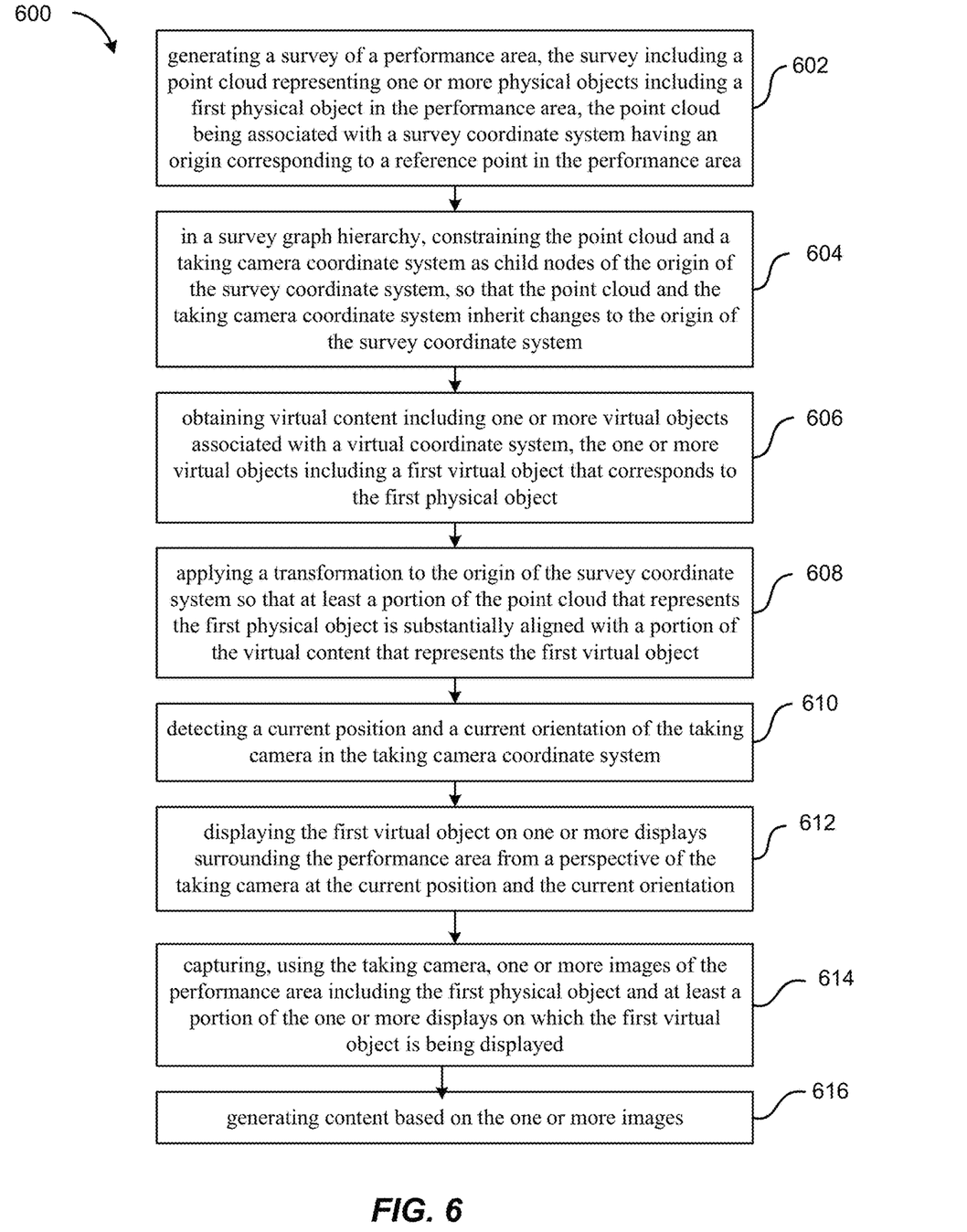
FIG. 6 is a simplified flowchart illustrating a method of content production according to some embodiments.

FIG. 6 is a simplified flowchart illustrating a method 600 of content production according to some embodiments.

The method 600 includes, at 602, generating a survey of a performance area. The survey includes a point cloud representing one or more physical objects including a first physical object in the performance area. The point cloud is associated with a survey coordinate system having an origin corresponding to a reference point in the performance area.

The method 600 further includes, at 604, in a survey graph hierarchy, constraining the point cloud and a taking camera coordinate system as child nodes of the origin of the survey coordinate system, so that the point cloud and the taking camera coordinate system inherit changes to the origin of the survey coordinate system.

The method 600 further includes, at 606, obtaining virtual content including one or more virtual objects associated with a virtual coordinate system. The one or more virtual objects include a first virtual object that corresponds to the first physical object.

The method 600 further includes, at 608, applying a transformation to the origin of the survey coordinate system so that at least a portion of the point cloud that represents the first physical object is substantially aligned with a portion of the virtual content that represents the first virtual object.

The method 600 further includes, at 610, detecting a current position and a current orientation of the taking camera in the taking camera coordinate system; and at 612, displaying the first virtual object on one or more displays surrounding the performance area from a perspective of the taking camera at the current position and the current orientation.

The method 600 further includes, at 614, capturing, using the taking camera, one or more images of the performance area including the first physical object and at least a portion of the one or more displays on which the first virtual object is being displayed; and at 616, generating content based on the one or more images.

It should be appreciated that the specific steps illustrated in FIG. 6 provide a particular method of content production according to some embodiments. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
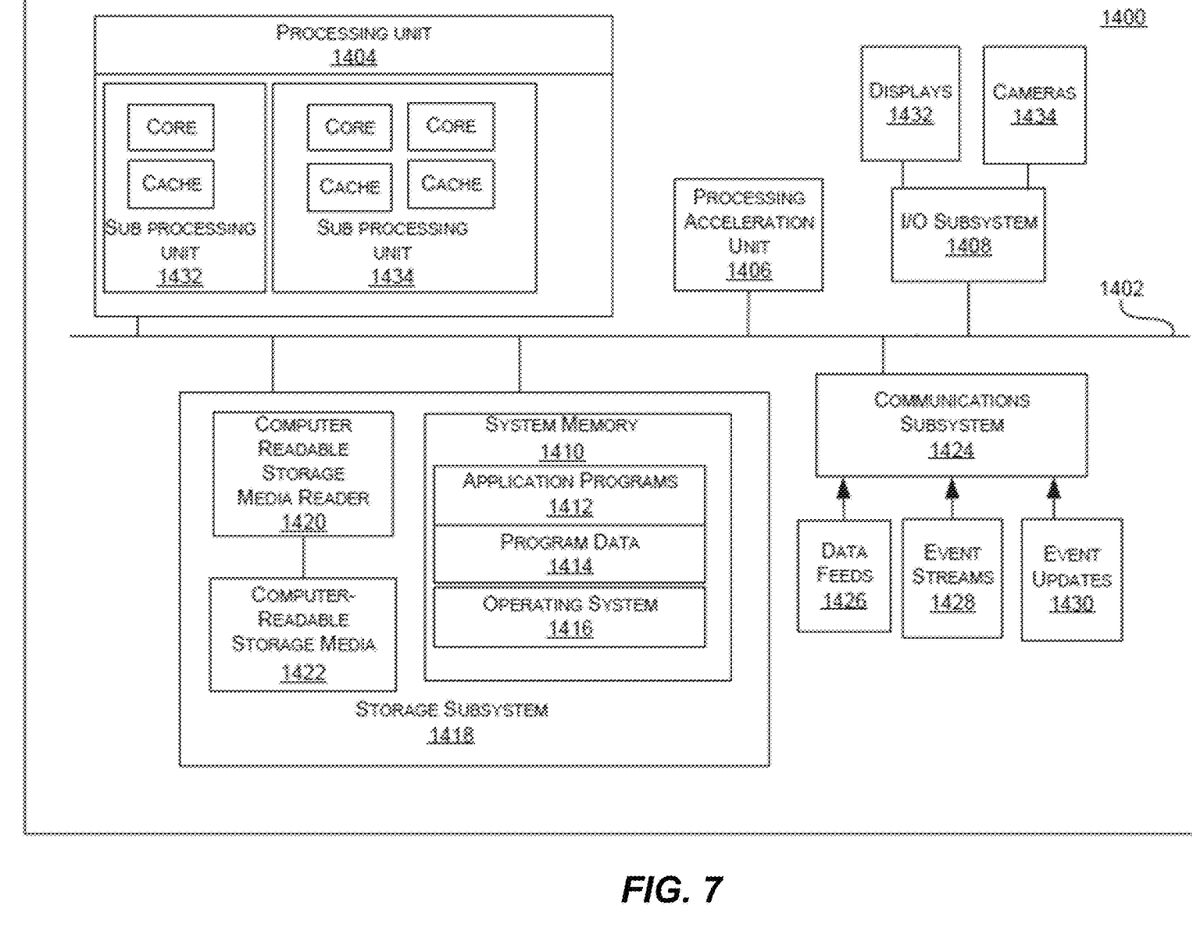
FIG. 7 illustrates a simplified block diagram of an immersive content production system according to some embodiments.

Each of the embodiments disclosed herein can be implemented in a special-purpose computer system. FIG. 7 illustrates a computer system 1400, in which various embodiments described herein can be implemented. The system 1400 can be used to implement any of the computer systems described above. As shown in the figure, computer system 1400 includes a processing unit 1404 that communicates with a number of peripheral subsystems via a bus subsystem 1402. These peripheral subsystems can include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem can utilize multiple buses. Bus subsystem 1402 can be any of several types of bus structures including a memory bus or memory controller, a peripheral bus, and a local bus using any of a variety of bus architectures. For example, such architectures can include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors can be included in processing unit 1404. These processors can include single core or multicore processors. In certain embodiments, processing unit 1404 can be implemented as one or more independent processing units 1432 and/or sub processing unit 1434 with single or multicore processors included in each processing unit. In other embodiments, processing unit 1404 can also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 can additionally include a processing acceleration unit 1406, which can include a digital signal processor (DSP), a special-purpose processor, and/or the like. And, in some embodiments, the processing unit or another component of system 1400 can include and/or operate a real-time gaming engine or other similar real-time rendering engine. Such an engine can render two-dimensional (2D) images from 3D data at interactive frame rates (e.g., 24, 48, 72, 96, or more frames per second). In one aspect, the real-time gaming engine can load the virtual environment for display on the displays surrounding the performance area. In some embodiments, the real-time gaming engine can load virtual assets into the virtual environment. The real-time gaming engine can then permit the virtual assets to interact or move according to simulated physics information stored by the real-time gaming engine. The real-time gaming engine can also update the virtual environment based on the movement and orientation of the taking camera(s).

I/O subsystem 1408 can include user interface input devices and user interface output devices. User interface input devices can include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices can include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices can also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices can include voice recognition sensing devices that enable users to interact with voice recognition systems (e.g., Siri® navigator), through voice commands. In some embodiments, the user interface devices enable an operator to provide input indicating the types of virtual assets and/or effects to be integrated into the virtual environment displayed during the performance. The operator can also indicate the particular configurations or trigger movements of the performer and/or physical objects in the performance area that are to be used to begin the loading and presentation of certain virtual assets. In some embodiments, the input received from the operator can occur in real-time and/or concurrently with a performance The system 1400 can include one or more displays 1432. The displays 1432 can be the displays 104 depicted in FIG. 1. The displays 1432 can form an enclosed performance area. In some embodiments, the displays 1432 can be formed from multiple light emitting diode (LED) panels. In some embodiments, the displays 1432 can be formed via multiple liquid crystal display (LCD) panels or thin-film transistor liquid-crystal display (TFT LCD) panels.

The system 1400 can include one or more cameras 1434. The one or more cameras can be digital cameras. Digital cinematography captures motion pictures digitally in a process analogous to digital photography. Professional cameras can include the Sony CineAlta(F) Series, Blackmagic Cinema Camera, RED ONE, Arriflex D-20, D-21 and Alexa, Panavisions Genesis, Silicon Imaging SI-2K, Thomson Viper, Vision Research Phantom, IMAX 3D camera based on two Vision Research Phantom cores, Weisscam HS-1 and HS-2, GS Vitec noX, and the Fusion Camera System. Digital cinematography cameras can capture images using complementary metal-oxide semiconductor (CMOS) or charge coupled device (CCD) sensors, usually in one of two arrangements. Single chip cameras that are designed specifically for the digital cinematography market often use a single sensor (much like digital photo cameras), with dimensions similar in size to a 16 or 35 mm film frame or even (as with the Vision 65) a 65 mm film frame. An image can be projected onto a single large sensor exactly the same way it can be projected onto a film frame, so cameras with this design can be made with positive lock (PL), Panavision (PV) and similar mounts, in order to use the wide range of existing high-end cinematography lenses available. Their large sensors also let these cameras achieve the same shallow depth of field as 35 or 65 mm motion picture film cameras, which many cinematographers consider an essential visual tool.

Unlike other video formats, which are specified in terms of vertical resolution (for example, 1080p, which is 1920× 1080 pixels), digital cinema formats are usually specified in terms of horizontal resolution. As a shorthand, these resolutions are often given in "nK" notation, where n is the multiplier of 1424 such that the horizontal resolution of a corresponding full-aperture, digitized film frame is exactly 1024n pixels.

For instance, a 2K image is 2048 pixels wide, and a 4K image is 4096 pixels wide. Vertical resolutions vary with aspect ratios though; so a 2K image with an HDTV (16:9) aspect ratio is 2048×1152 pixels, while a 2K image with a standard definition television (SDTV) or Academy ratio (4:3) is 2048×1536 pixels, and one with a Panavision ratio (2.39:1) would be 2048×856 pixels, and so on. Due to the "nK" notation not corresponding to specific horizontal resolutions per format a 2K image lacking, for example, the typical 35 mm film soundtrack space, is only 1828 pixels wide, with vertical resolutions rescaling accordingly.

All formats designed for digital cinematography are progressive scan, and capture usually occurs at the same 24 frame per second rate established as the standard for 35 mm film. Some films have a High Frame Rate of 48 fps, although most traditional theaters use 24 fps. The DCI standard for cinema usually relies on a 1.89:1 aspect ratio, thus defining the maximum container size for 4K as 4096×2160 pixels and for 2K as 2048×1080 pixels.

Broadly, several workflow paradigms can be used for data acquisition and storage in digital cinematography. With video-tape-based workflow, video is recorded to tape on set. This video is then ingested into a computer running non-linear editing software, using a deck. Upon ingestion, a digital video stream from tape is converted to computer files. These files can be edited directly or converted to an intermediate format for editing. Then video is output in its final format, possibly to a film recorder for theatrical exhibition, or back to video tape for broadcast use. Original video tapes are kept as an archival medium. The files generated by the non-linear editing application contain the information necessary to retrieve footage from the proper tapes, should the footage stored on the computer's hard disk be lost. With increasing convenience of file-based workflows, the tape-based workflows have become marginal in recent years.

Digital cinematography can use tapeless or file-based workflows. This trend has accelerated with increased capacity and reduced cost of non-linear storage solutions such as hard disk drives, optical discs, and solid-state memory. With tapeless workflows digital video is recorded as digital files onto random-access media like optical discs, hard disk drives or flash memory-based digital magazines. These files can be easily copied to another storage device, typically to a large RAID (array of computer disks) connected to an editing system. Once data is copied from the on-set media to the storage array, they are erased and returned to the set for more shooting.

Such RAID arrays, both of managed (for example, storage area networks (SANs) and networked attached storage (NASs) and unmanaged (for example, just a bunch of disks (JBoDs) on a single computer workstation), are necessary due to the throughput required for real-time (320 Megabits per second for 2K @ 24 frames per second) or near-real-time playback in post-production, compared to throughput available from a single, yet fast, hard disk drive. Such requirements are often termed as on-line or cloud storage. Post-production not requiring real-time playback performances (typically for lettering, subtitling, versioning and other similar visual effects) can be migrated to slightly slower RAID stores.

Short-term archiving, if ever, is accomplished by moving the digital files into slower redundant array of independent disks (RAID) arrays (still of either managed and unmanaged type, but with lower performances), where playback capability is poor to non-existent (unless via proxy images), but minimal editing and metadata harvesting still feasible. Such intermediate requirements easily fall into the mid-line storage category.

Long-term archiving is accomplished by backing up the digital files from the RAID, using standard practices and equipment for data backup from the information technology industry, often to data tapes (like linear tape open (LTOs)).

The system can include one or more spherical cameras. A spherical camera can be called an omnidirectional camera, also known as 360-degree camera, is a camera having a field of view that covers approximately the entire sphere or at least a full circle in the horizontal plane. 360-degree videos, also known as immersive videos, or spherical videos, are video recordings where a view in every direction is recorded at the same time, shot using an omnidirectional camera or a collection of cameras. During playback on normal flat display the viewer has control of the viewing direction like a panorama. It can also be played on a displays or projectors arranged in a sphere or some part of a sphere.

360-degree video is typically recorded using either a special rig of multiple cameras, or using a dedicated camera that contains multiple camera lenses embedded into the device, and filming overlapping angles simultaneously. Through a method known as video stitching, this separate footage is merged into one spherical video piece, and the color and contrast of each shot is calibrated to be consistent with the others. This process is done either by the camera itself, or using specialized software that can analyze common visuals and audio to synchronize and link the different camera feeds together. Generally, the only area that cannot be viewed is the view toward the camera support.

360-degree video is typically formatted in an equirectangular projection and is either monoscopic, with one image directed to both eyes, or stereoscopic, viewed as two distinct images directed individually to each eye for a 3D effect. Due to this projection and stitching, equirectangular video exhibits a lower quality in the middle of the image than at the top and bottom.

Specialized omnidirectional cameras and rigs have been developed for the purpose of filming 360-degree video, including rigs such as GoPro's Omni and Odyssey (which consist of multiple action cameras installed within a frame), and contained cameras like the HumanEyes Vuze and Nokia OZO, There have also been handheld dual-lens cameras such as the Ricoh Theta S, Samsung Gear 360, Garmin VIRB 360, and the Kogeto Dot 360—a panoramic camera lens accessory developed for the iPhone 4, 4S, and Samsung Galaxy Nexus.

User interface input devices can also include, without limitation, three dimensional (3-D) mice, joysticks or pointing sticks, gamepads and graphic tablets, and audio/visual devices such as speakers, digital cameras, digital camcorders, portable media players, webcams, image scanners, fingerprint scanners, barcode reader 3-D scanners, 3-D printers, laser rangefinders, and eye gaze monitoring devices. Additionally, user interface input devices can include, for example, medical imaging input devices such as computed tomography, magnetic resonance imaging, position emission tomography, medical ultrasonography devices. User interface input devices can also include, for example, audio input devices such as MIDI keyboards, digital musical instruments and the like.

User interface output devices can include a display subsystem, indicator lights, or non-visual displays such as audio output devices, etc. The display subsystem can be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices can include, without limitation, a variety of display devices that visually convey text, graphics and audio/video information such as monitors, printers, speakers, headphones, automotive navigation systems, plotters, voice output devices, and modems.

Computer system 1400 can comprise a storage subsystem 1418 that comprises software elements, shown as being currently located within a system memory 1410. System memory 1410 can store program instructions that are loadable and executable on processing unit 1404, as well as data generated during the execution of these programs.

Depending on the configuration and type of computer system 1400, system memory 1410 can be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 can include multiple different types of memory, such as static random access memory (SRAM) or dynamic random access memory (DRAM). In some implementations, a basic input/output system (BIOS), containing the basic routines that help to transfer information between elements within computer system 1400, such as during start-up, can typically be stored in the ROM. By way of example, and not limitation, system memory 1410 also illustrates application programs 1412, which can include client applications, web browsers, mid-tier applications, relational database management systems (RDBMS), etc., program data 1414, and an operating system 1416. By way of example, operating system 1416 can include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1418 can also provide a tangible computer-readable storage medium for storing the basic programming and data constructs that provide the functionality of some embodiments. Software (programs, code modules, instructions) that when executed by a processor provide the functionality described above can be stored in storage subsystem 1418. These software modules or instructions can be executed by processing unit 1404. Storage subsystem 1418 can also provide a repository for storing data used in accordance with the present invention.

Storage subsystem 1400 can also include a computer-readable storage media reader 1420 that can further be connected to computer-readable storage media 1422. Together and, optionally, in combination with system memory 1410, computer-readable storage media 1422 can comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 can include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 can include, but is not limited to, Zip® drives, flash memory cards, universal serial bus (USB) flash drives, secure digital (SD) cards, DVD disks, digital video tape, and the like. Computer-readable storage media 1422 can also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media can provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 can enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 can also receive input communication in the form of structured and/or unstructured data feeds 1426, event streams 1428, event updates 1430, and the like on behalf of one or more users who can use computer system 1400.

By way of example, communications subsystem 1424 can be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 can also be configured to receive data in the form of continuous data streams, which can include event streams 1428 of real-time events and/or event updates 1430, that can be continuous or unbounded in nature with no explicit end. Examples of applications that generate continuous data can include, for example, sensor data applications, financial tickers, network performance measuring tools (e.g. network monitoring and traffic management applications), clickstream analysis tools, automobile traffic monitoring, and the like.

Communications subsystem 1424 can also be configured to output the structured and/or unstructured data feeds 1426, event streams 1428, event updates 1430, and the like to one or more databases that can be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, can be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention can be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes can be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments can be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations can be re-arranged. A process is terminated when its operations are completed, but could have additional steps not included in a figure. A process can correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc., can be passed, forwarded, or transmitted via any suitable means including memory sharing, message passing, token passing, network transmission, etc.

Furthermore, embodiments can be implemented by hardware, software, firmware, middleware, microcode, hardware description languages, or any combination thereof. When implemented in software, firmware, middleware or microcode, the program code or code segments to perform the necessary tasks can be stored in a machine readable medium. A processor(s) can perform the necessary tasks.

In the foregoing specification, aspects of the invention are described with reference to specific embodiments thereof, but those skilled in the art will recognize that the invention is not limited thereto. Various features and aspects of the above-described invention can be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of content production, the method comprising:
   generating a survey of a performance area, the survey including a point cloud representing one or more physical objects including a first physical object in the performance area, the point cloud being associated with a survey coordinate system having an origin corresponding to a reference point in the performance area;

in a survey graph hierarchy, constraining the point cloud and a taking camera coordinate system as child nodes of the origin of the survey coordinate system, so that the point cloud and the taking camera coordinate system inherit changes to the origin of the survey coordinate system;

obtaining virtual content including one or more virtual objects associated with a virtual coordinate system, the one or more virtual objects including a first virtual object that corresponds to the first physical object;

applying a transformation to the origin of the survey coordinate system so that at least a portion of the point cloud that represents the first physical object is substantially aligned with a portion of the virtual content that represents the first virtual object;

detecting a current position and a current orientation of the taking camera in the taking camera coordinate system;

displaying the first virtual object on one or more displays surrounding the performance area from a perspective of the taking camera at the current position and the current orientation;

capturing, using the taking camera, one or more images of the performance area including the first physical object and at least a portion of the one or more displays on which the first virtual object is being displayed; and generating content based on the one or more images.

2. The method of claim 1, further comprising acquiring, using one or more alignment devices positioned around the performance area, positional information of the one or more physical objects in the performance area, and wherein generating the survey of the performance area is based on the positional information.

3. The method of claim 2, wherein:
the one or more alignment devices comprise a plurality of alignment cameras positioned at a plurality of locations around the performance area;
the positional information comprises a plurality of 2-D images captured by the plurality of alignment cameras; and
generating the survey comprises generating the point cloud based on the plurality of 2-D images by using a photogrammetric technique.

4. The method of claim 2, wherein the one or more alignment devices comprise one or more 3-D sensors.

5. The method of claim 1, wherein the virtual content comprise a 3-D mesh or a point cloud representing the one or more virtual objects.

6. The method of claim 1, further comprising determining the transformation by:
identifying a plurality of landmark nulls on the point cloud representing the first physical object;
identifying a plurality of target nulls on the first virtual object, each respective target null corresponding to a respective landmark null on the point cloud; and
determining the transformation so that, after applying the transformation to the origin of the survey coordinate system, the plurality of landmark nulls on the point cloud substantially matches with the plurality of target nulls.

7. The method of claim 6, wherein determining the transformation is performed using a least square regression algorithm.

8. The method of claim 6, further comprising constraining the plurality of landmark nulls as a child node of the origin of the survey coordinate system in the survey graph hierarchy.

9. The method of claim 1, further comprising determining the transformation by performing registration between the portion of the point cloud and the portion of the virtual content using a best fit algorithm.

10. The method of claim 9, wherein the best fit algorithm comprises an iterative closest point (ICP) algorithm.

11. The method of claim 1, wherein the transformation includes one or more of a rotation, a translation, and a scaling.

12. The method of claim 1, wherein determining the current position and the current orientation of the taking camera is performed by using one or more motion sensors, one or more alignment devices, one or more GPS receivers attached to the taking camera, or a combination thereof.

13. The method of claim 1, wherein the one or more images comprise one or more frames of a video or a movie.

14. An immersive content production system comprising:
a performance area;
one or more displays surrounding the performance area for displaying virtual content;
a taking camera for capturing images of the performance area and a portion of the one or more displays displaying the virtual content;
one or more sensors for detecting a current position and a current orientation of the taking camera in a taking camera coordinate system;
a computer memory storing:
a survey of the performance area associated with a survey coordinate system having an origin corresponding to a reference point in the performance area, the survey including a point cloud representing a first physical object in the performance area; and
the virtual content associated with a virtual coordinate system, the virtual content including a first virtual object corresponding to the first physical object; and
one or more computer processors configured to:
in a survey graph hierarchy, constrain the point cloud and the taking camera coordinate system as child nodes of the origin of the survey coordinate system, so that the point cloud and the taking camera coordinate system inherit changes to the origin of the survey coordinate system;
apply a transformation to the origin of the survey coordinate system so that at least a portion of the point cloud that represents the first physical object is substantially aligned with a portion of the virtual content that represents the first virtual object; and
cause the virtual content to be displayed on the one or more displays from a perspective of the taking camera at the current position and the current orientation while the taking camera is capturing the images, the images including the first physical object and at least a portion of the one or more displays on which the first virtual object is being displayed.

15. The immersive content production system of claim 14, further comprising one or more alignment devices positioned around the performance area and configured to acquire positional information of one or more physical objects in the performance area, and wherein the one or more computer processors are further configured to generate the survey of the performance area based on the positional information.

16. The immersive content production system of claim 15, wherein:
- the one or more alignment devices comprise a plurality of alignment cameras positioned at a plurality of locations around the performance area;
- the positional information comprises a plurality of 2-D images captured by the plurality of alignment cameras; and
- generating the survey comprises generating the point cloud based on the plurality of 2-D images by using a photogrammetric technique.

17. The immersive content production system of claim 15, wherein the one or more alignment devices comprise one or more 3-D sensors.

18. The immersive content production system of claim 14, wherein the one or more computer processors are further configured to determine the transformation by:
- identifying a plurality of landmark nulls on the point cloud representing the first physical object;
- identifying a plurality of target nulls on the first virtual object, each respective target null corresponding to a respective landmark null on the point cloud; and
- determining the transformation so that, after applying the transformation to the origin of the survey coordinate system, the plurality of landmark nulls on the point cloud substantially matches with the plurality of target nulls.

19. The immersive content production system of claim 18, wherein the one or more computer processors are further configured to:
- determine the transformation by performing registration between the portion of the point cloud that represents the first physical object and a portion of the virtual content that represents the first virtual object using a best fit algorithm.

20. The immersive content production system of claim 14, wherein the transformation includes one or more of a rotation, a translation, and a scaling.

* * * * *